United States Patent
Ootake (10) Patent No.: US 6,698,192 B2
(45) Date of Patent: Mar. 2, 2004

(54) FUEL INJECTION CONTROL FOR DIESEL ENGINE

(75) Inventor: Makoto Ootake, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/303,707

(22) Filed: Nov. 26, 2002

(65) Prior Publication Data

US 2003/0140623 A1 Jul. 31, 2003

(30) Foreign Application Priority Data

Jan. 31, 2002 (JP) ........................................ 2002-023805

(51) Int. Cl.⁷ ............................................... F01N 3/00
(52) U.S. Cl. ............................. 60/297; 60/274; 60/285; 60/311
(58) Field of Search ..................... 60/274, 285, 295, 60/297, 311

(56) References Cited

U.S. PATENT DOCUMENTS

| | | | | |
|---|---|---|---|---|
| 5,850,735 A | * | 12/1998 | Araki et al. | 60/274 |
| 5,974,791 A | * | 11/1999 | Hirota et al. | 60/276 |
| 6,367,246 B1 | * | 4/2002 | Hirota et al. | 60/295 |
| 6,405,528 B1 | * | 6/2002 | Christen et al. | 60/295 |
| 6,490,857 B2 | * | 12/2002 | Sasaki | 60/278 |
| 6,497,095 B2 | * | 12/2002 | Carberry et al. | 60/295 |

FOREIGN PATENT DOCUMENTS

| | | | |
|---|---|---|---|
| JP | 7-011935 A | | 1/1995 |
| JP | 7-279645 A | | 10/1995 |
| JP | 8-042326 A | | 2/1996 |
| JP | 2000-170526 | * | 6/2000 |
| JP | 2001-115822 | * | 4/2001 |

* cited by examiner

Primary Examiner—Thomas Denion
Assistant Examiner—Diem Tran
(74) Attorney, Agent, or Firm—Foley & Lardner (57) ABSTRACT

A particulate filter (4) is provided in an exhaust passage (3) of a diesel engine (1) in order to trap particulate matter in exhaust gas. A controller (11) determines a basic fuel injection amount in response to an accelerator pedal depression amount (S22), determines a maximum fuel injection amount in response to an intake air amount of the engine (1) (S10), and sets the smaller of the basic fuel injection amount and the maximum fuel injection amount as the target injection amount (S24–S26). When the deposited amount of particulate matter on the particulate matter filter (4) has exceeded a predetermined amount, reductions in output torque are prevented by increasing the maximum injection amount (S13).

19 Claims, 9 Drawing Sheets

12 DIFFERENTIAL PRESSURE SENSOR
13 CRANK ANGLE SENSOR
14 ACCELERATOR PEDAL DEPRESSION SENSOR
15 AIR FLOW METER
16 TEMPERATURE SENSOR
21 TEMPERATURE SENSOR
22 PRESSURE SENSOR
23 WATER TEMPERATURE SENSOR

FIG.1

12 DIFFERENTIAL PRESSURE SENSOR
13 CRANK ANGLE SENSOR
14 ACCELERATOR PEDAL DEPRESSION SENSOR
15 AIR FLOW METER
16 TEMPERATURE SENSOR
21 TEMPERATURE SENSOR
22 PRESSURE SENSOR
23 WATER TEMPERATURE SENSOR

FUEL INJECTION CONTROL FOR DIESEL ENGINE

FIELD OF THE INVENTION

This invention relates to fuel injection control for a diesel engine adapted to trap particulate matter contained in exhaust gas discharged from the diesel engine.

BACKGROUND OF THE INVENTION

Tokkai 7-11935 published by the Japanese Patent Office in 1995 discloses a filter for particulate matter (hereinafter referred to as particulate filter) which traps particulate matter contained in exhaust gas from a diesel engine of a vehicle. Particulate matter may also be termed smoke.

SUMMARY OF THE INVENTION

Generally a diesel engine operates at a lean air fuel ratio, in other words, at an excess air factor which is greater than unity. When large amounts of particulate matter are deposited in the particulate filter, the deposited particulate matter is combusted by controlling the fuel injection amount to increase the exhaust gas temperature of the engine so that the excess air factor is approximately equal to one. This operation is termed regeneration of the particulate filter.

Immediately before regeneration of the particulate filter, a considerable amount of particulate matter has been deposited in the particulate filter. The particulate matter deposited in the particulate filter increases the flow resistance to the exhaust gas. The increase in the exhaust gas resistance increases the exhaust gas pressure and as a result the intake air amount of the engine decreases. This decrease in the intake air amount causes a reduction in the output torque of the engine, particularly in fully loaded operating regions. A fully loaded operating region is an operating state in which an accelerator pedal of the vehicle is fully depressed.

It is therefore an object of this invention to reduce the effect of particulate matter deposits in the particulate filter on the output torque of the engine.

In order to achieve the above object, this invention provides a fuel injection control device for such a diesel engine that comprises an exhaust passage discharging exhaust gas produced by combustion of a mixture of fuel and air, and a particulate filter trapping particulate matter contained in the exhaust gas.

The device comprises a fuel injector injecting fuel, a sensor detecting a required output of the diesel engine, a sensor detecting an intake air amount of the diesel engine, a sensor detecting an operation condition of the engine, and a programmable controller controlling a fuel injection amount of the fuel injector to a target fuel injection amount.

The controller is programmed to calculate a basic fuel injection amount based on the required output, calculate a maximum fuel injection amount in response to the intake air amount, determine based on the operating condition whether or not a deposited amount of the particulate matter on the particulate filter has exceeded a predetermined amount, increase the maximum fuel injection amount when the deposited amount of the particulate matter has exceeded the predetermined amount, and set the smaller of the basic fuel injection amount and the maximum fuel injection amount as the target fuel injection amount.

This invention also provides a fuel injection control method for such a diesel engine that comprises an exhaust passage discharging exhaust gas produced by combustion of a mixture of fuel and air, a fuel injector injecting fuel and a particulate filter trapping particulate matter contained in the exhaust gas.

The method comprises detecting a required output of the diesel engine, detecting an intake air amount of the diesel engine, detecting an operation condition of the engine, controlling a fuel injection amount of the fuel injecting means to a target fuel injection amount, calculating a basic fuel injection amount based on the required output, calculating a maximum fuel injection amount in response to the intake air amount, determining based on the operating condition whether or not a deposited amount of the particulate matter on the particulate filter has exceeded a predetermined amount, increasing the maximum fuel injection amount when the deposited amount of the particulate matter has exceeded the predetermined amount, and setting the smaller of the basic fuel injection amount and the maximum fuel injection amount as the target fuel injection amount.

The details as well as other features and advantages of this invention are set forth in the remainder of the specification and are shown in the accompanying drawings.

DESCRIPTION OF THE PREFERRED EMBODIMENTS

Figure 1:
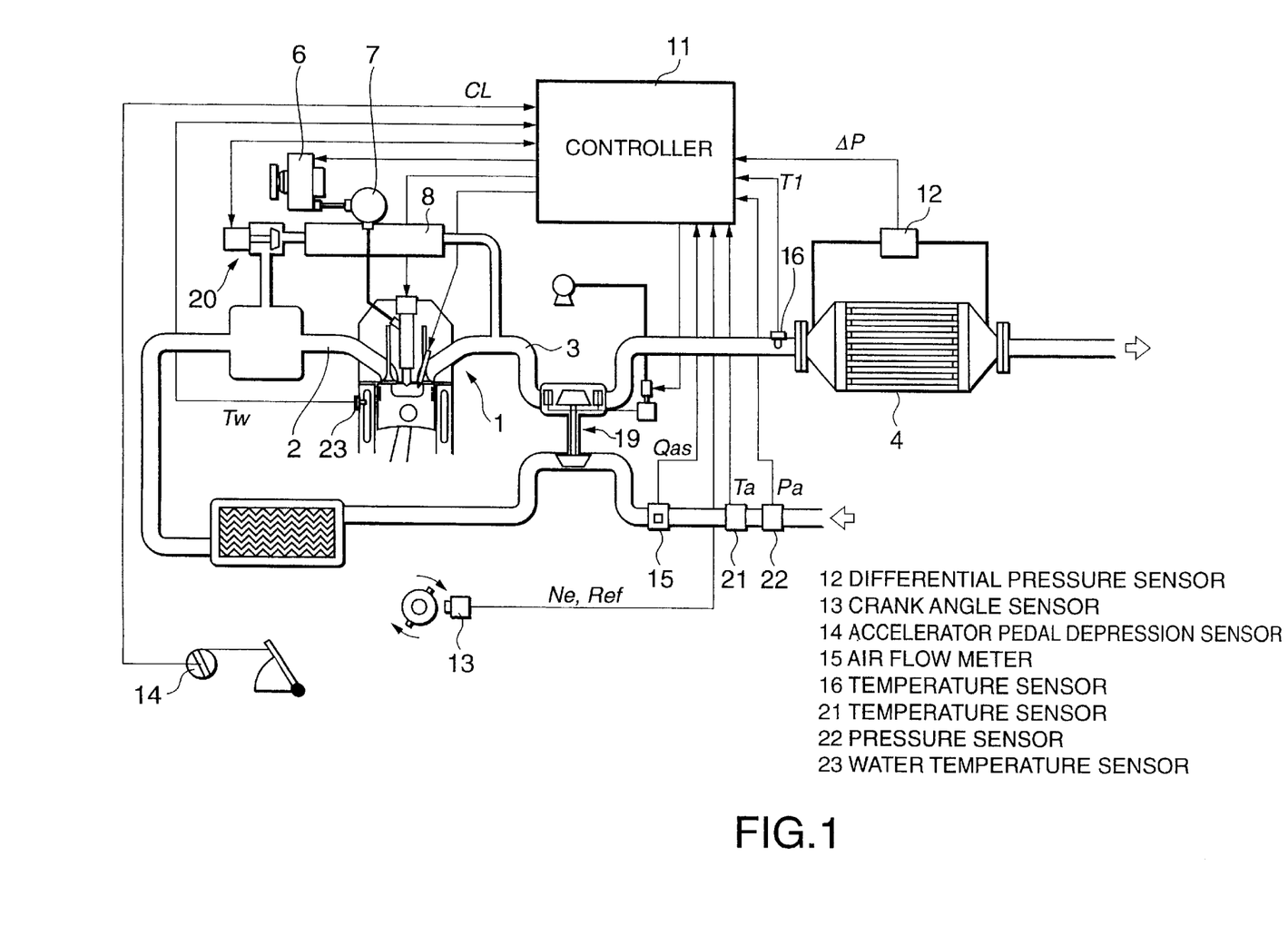
FIG. 1 is a schematic diagram of a fuel injection control device according to this invention.

Referring to FIG. 1 of the drawings, a diesel engine 1 for a vehicle is provided with an intake passage 2 for aspirating air and an exhaust passage 3 for discharging combustion gas as exhaust gas.

Air is supplied under pressure to the intake passage 2 by a variable geometry turbocharger 19. A portion of the exhaust gas in the exhaust passage 3 is recirculated to the intake passage 2 through an exhaust gas recirculation valve 20. Fuel is injected into the diesel engine 1 by a fuel supply device comprising a supply pump 6, a common rail 7 and fuel injectors 8. The diesel engine 1 is rotated using compression ignition to combust a gaseous mixture of air aspirated from the intake passage 2 and injected fuel. The fuel injector 8 varies the injection timing and the fuel injection amount in response to output signals from a controller 11.

The combustion gas resulting from the gaseous mixture is discharged as exhaust gas from the exhaust passage 3 into the atmosphere through a particulate filter 4 which traps particulate matter.

Apart from controlling the fuel injection of the fuel injector 8, the controller 11 uses output signals in order to control the operation of the supply pump 5, the variable geometry system of the turbocharger 19 and the opening of the exhaust gas recirculation valve 20.

The controller 11 comprises a microcomputer provided with a central processing unit (CPU), a read only memory (ROM), a random access memory (RAM) and an input/output interface (I/O interface). The controller may also comprise a plurality of microcomputers.

In order to realize the above control, the controller 11 is provided with detected data in the form of signals from a differential pressure sensor 12 detecting a pressure differential upstream and downstream of the particulate filter 4, a crank angle sensor 13 detecting a predetermined rotation angle and a rotation speed Ne of the diesel engine 1, an accelerator pedal depression sensor 14 detecting a depression amount CL of an accelerator pedal provided in the vehicle, an airflow meter 15 detecting an air flowrate Qas in the intake passage 2, a temperature sensor 16 detecting a temperature T1 of an inlet of the particulate filter 4, and a water temperature sensor 23 detecting a cooling water temperature of the diesel engine 1.

The controller 11 estimates a deposited amount of particulate matter in the particulate filter 4 based on the pressure differential ΔP upstream and downstream of the particulate filter 4, that is to say, the pressure loss caused by the particulate filter 4. The fuel injection amount is then controlled by taking the deposited amount into account. The deposited amount of particulate matter is also used in order to determine whether or not regeneration of the particulate filter 4 is necessary. When regeneration is necessary, the exhaust gas temperature is increased by performing fuel injection control in order to combust the particulate matter deposited on the particulate filter 4. Steps including delaying the fuel injection timing and performing auxiliary injection after normal injection are included in the fuel injection control for increasing the exhaust gas temperature.

Particularly large amounts of particulate matter are produced when the diesel engine 1 is operating in or near to a fully loaded state, i.e., when the accelerator pedal is fully depressed. Consequently the controller 11 suppresses the production of particulate matter by executing the following control routine on the fuel injection amount.

Firstly a basic fuel injection amount Mqdr is calculated on the basis of the engine rotation speed Ne and the accelerator pedal depression amount CL. A fuel injection amount Qf1 is calculated by adding various types of corrections to the calculated value for Mqdr. The value for the fuel injection amount Qf1 which is calculated in the above manner is a value which represents the output torque of the diesel engine 1 which is required by the driver of the vehicle as a result of depressing the accelerator pedal.

The controller 11 sets the intake air amount Qac per cylinder calculated on the basis of the intake air flowrate Qas detected by the airflow meter 15 and a maximum injection amount Qfmax in response to the engine rotation speed Ne detected by the rotation speed sensor 13. The production of particulate matter is suppressed by limiting the fuel injection amount Qf1 so as not to exceed the maximum injection amount Qfmax. The calculation of the intake air amount Qac per cylinder which forms the basis of the calculation of the maximum injection amount Qfmax is performed by taking into account the time delay until air passing through the airflow meter 15 enters diesel engine 1. This calculation is disclosed in U.S. Pat. No. 5,964,820.

Figure 3:
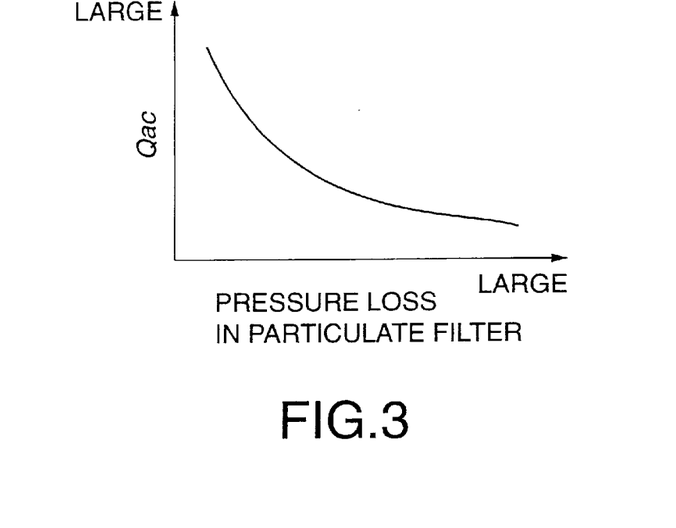
FIG. 3 is a diagram describing the relationship of a cylinder intake air amount of the engine and a pressure loss in a particulate filter.

Immediately before regeneration of the particulate filter 4, the exhaust gas pressure increases and, as shown in FIG. 3, the intake air amount Qac per cylinder decreases as a result of deposited particulate matter. Consequently since the maximum injection amount Qfmax decreases, there is the possibility that output torque will be insufficient in operating regions where the diesel engine 1 is fully loaded. In this situation, the controller 11 sets the maximum injection amount Qfmax in response to the deposited amount of particulate matter so that the maximum injection amount Qfmax does not become excessively small.

Figure 4:
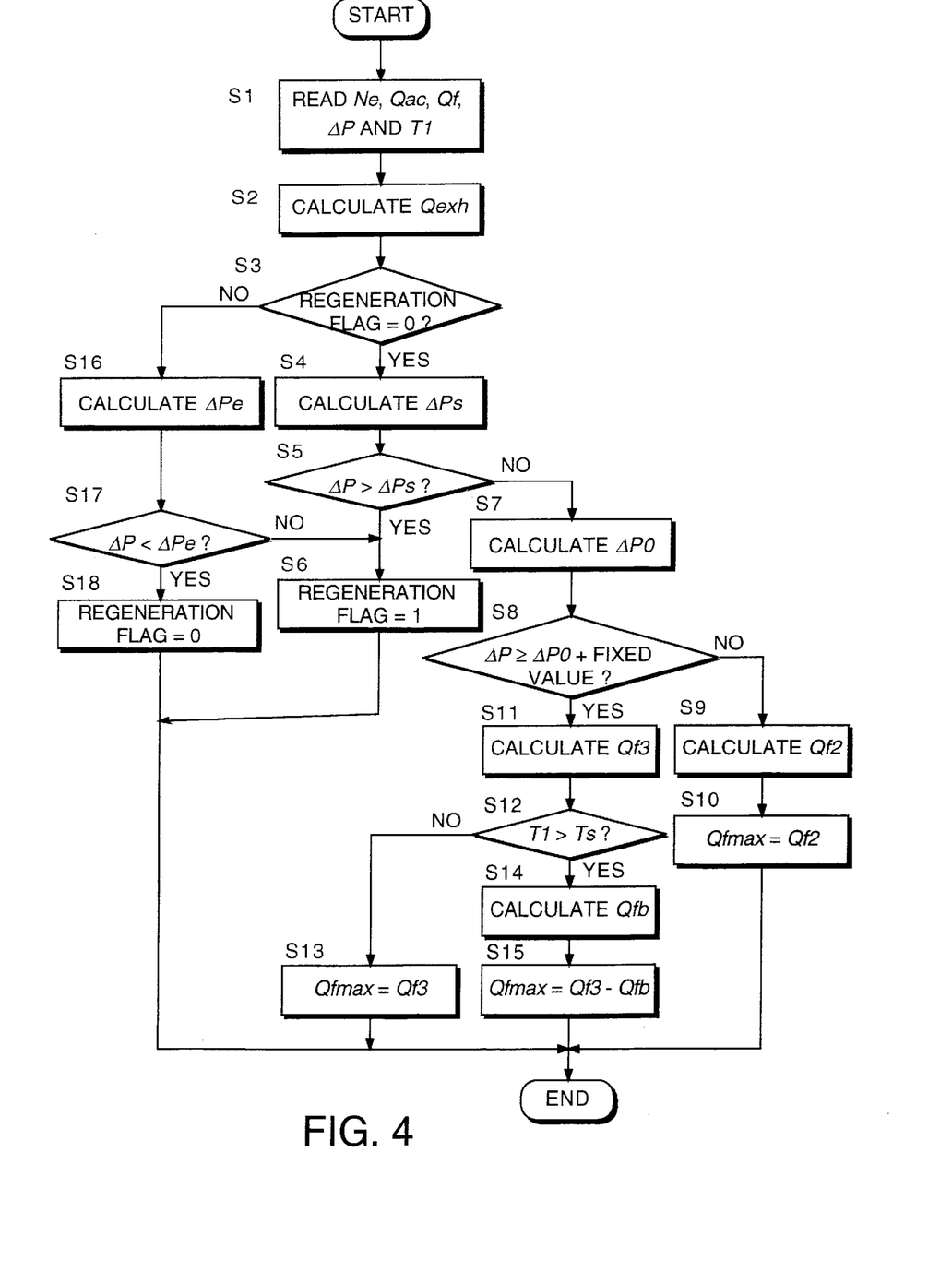
FIG. 4 is a flowchart describing a setting routine for a maximum injection amount Qfmax and a regeneration flag which is executed by a controller according to this invention.

The controller 11 executes a setting routine for the maximum injection amount and a regeneration flag as shown in FIG. 4 at an interval of ten milliseconds while the diesel engine 1 is operating in order to control the fuel injection amount as described above.

Referring to FIG. 4, firstly in a step S1, the controller 11 reads the engine rotation speed Ne, the intake air amount per cylinder Qac, the fuel injection amount Qf, the pressure differential ΔP upstream and downstream of the particulate filter 4 and the temperature T1 at the inlet to the particulate filter 4. The fuel injection amount Qf is the injection amount of fuel actually injected by the fuel injector 8. The value for Qf is the most up-to-date value calculated by the controller 11 using a fuel injection amount calculation routine performed by the controller 11 independently from the routine of FIG. 4. The fuel injection amount calculation routine will be described later.

Next in a step S2, the controller 11 calculates an exhaust gas flow amount Vex1 (liter/second) using Equations (1) to (3).

$$Qac1 = \frac{Qac \cdot Ne}{2} \cdot \frac{\text{Nos. of cylinder}}{1000} \tag{1}$$

$$Qf5 = Qf \cdot Ne \cdot CONST \tag{2}$$

$$Vex1 = \frac{Qac1 \cdot 60}{\sigma 2} + Qf5 \tag{3}$$

where,

No. of cylinders=number of cylinders in diesel engine 1,

CONS T=unit conversion coefficient, and

σ2=air density (gram/liter).

The units for Qac1 are gram/second, the units for Qac are milligram/stroke, the units for Ne are revolutions per minute (rpm), the units for Qf5 are liter/hour and the units for Of are cubic millimeter per stroke (mm$^3$/stroke).

In the step S2, a further conversion based on the pressure differential $\Delta P$ and the exhaust gas temperature T1 is performed on the calculated exhaust gas flow amount Vex1 (liter/second) in order to convert to an exhaust gas flowrate Qexh (cubic meter/minute (m$^3$/minute)) at one atmosphere of pressure and an atmospheric temperature of 20 degrees centigrade (° C.).

Next in a step S3, the controller 11 determines whether or not the regeneration flag has a value of zero. The regeneration flag is set to unity when the regeneration conditions for the particulate filter 4 are satisfied. When this is not the case, it is set to zero. The initial value of the regeneration flag is zero.

When the regeneration flag has a value of zero, that is to say, when the regeneration conditions for the particulate filter 4 are not satisfied, in a step S4, the controller 11 calculates a determination value $\Delta Ps$.

This determination value $\Delta Ps$ is a value corresponding to the differential pressure $\Delta P$ upstream and downstream of the particulate filter 4 in order to determine whether or not regeneration of the particulate filter 4 should be commenced. The determination value $\Delta Ps$ is set on the basis of experiment.

When the regeneration flag takes a value of unity rather than zero, that is to say, when the regeneration conditions for the particulate filter 4 are satisfied, in a step S16, the controller 11 calculates a determination value $\Delta Pe$. The determination value $\Delta Pe$ is a value corresponding to the differential pressure $\Delta P$ upstream and downstream of the particulate filter 4 in order to determine whether or not regeneration of the particulate filter 4 should be terminated. The determination value $\Delta Pe$ is set on the basis of experimentÅB The above determination values $\Delta Ps$, $\Delta Pe$ are calculated in this routine by referring to a map having the characteristics shown in FIG. 5 which is pre-stored in the memory of the controller 11. As shown by the solid line in FIG. 5, the determination values $\Delta Ps$ and $\Delta Pe$ both increase as the exhaust gas flowrate Qexh increases. When the exhaust gas flowrate Qexh is held constant, the determination value $\Delta Ps$ is normally larger than the determination value $\Delta Pe$. This shows that pressure loss caused by the particulate filter 4 is largest when regeneration of the particulate filter 4 is commenced and is smallest when the regeneration operation is completed.

Figure 5:
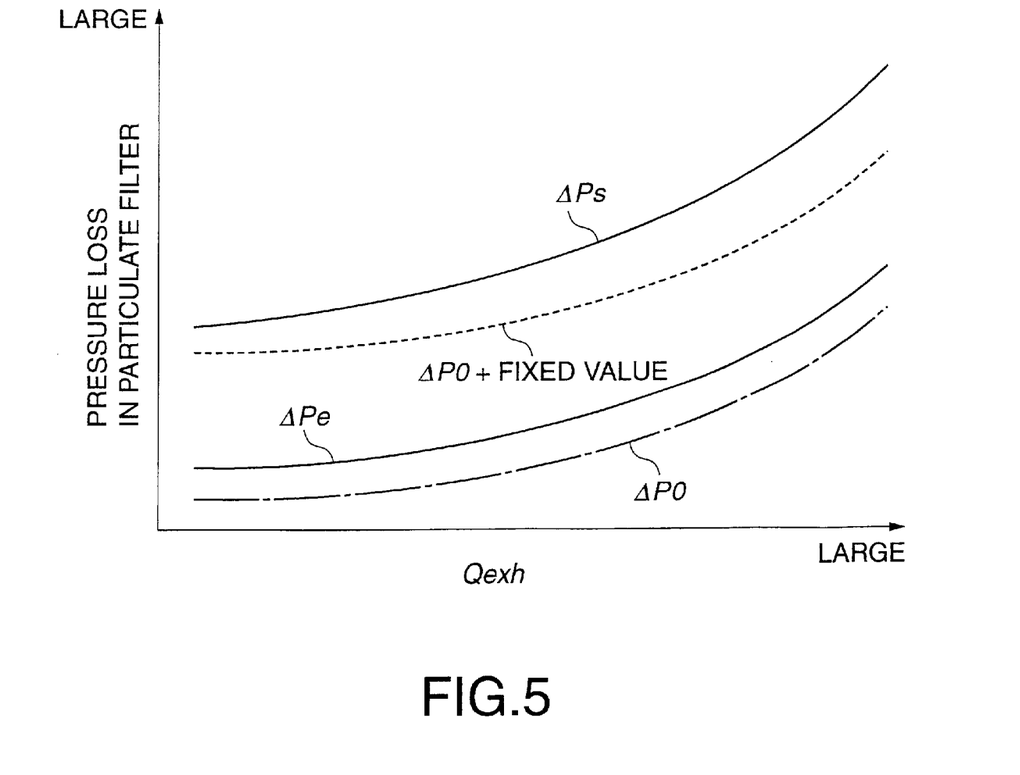
FIG. 5 is a diagram describing the characteristics of a pressure loss map stored in the controller in order to determine a state of the particulate filter.

The reason that the determination values $\Delta Pe$ and $\Delta Ps$ increase as the exhaust gas flowrate Qexh increases is due to the fact that the pressure loss in the particulate filter 4 is not merely a function of the deposited amount of particulate matter, but also depends on the exhaust gas flowrate Qexh. That is to say, when the deposited amount of particulate matter is held constant, the pressure loss also increases as the exhaust gas flowrate Qexh increases.

When the regeneration flag is zero, after executing the step S4, the routine proceeds to a step S5. In the step S5, the controller 11 compares the determination value $\Delta Ps$ with the pressure differential $\Delta P$ upstream and downstream of the particulate filter 4 detected by the pressure differential sensor 12. When the pressure differential $\Delta P$ is greater than the determination value $\Delta Ps$, the regeneration flag is set to unity in a step S6 and the routine is terminated. This process means that the determination in the step S3 will be negative on the immediately subsequent occasion when the routine is performed.

On the other hand, in a step S5, when the pressure differential $\Delta P$ is not greater than the determination value $\Delta Ps$, in a step S7, the controller 11 looks up the map described above in order to calculate a standard pressure loss $\Delta P0$. The standard pressure loss $\Delta P0$ is a pressure loss when absolutely no particulate matter has been deposited on the particulate filter 4. The dotted line in FIG. 5 shows that although the standard pressure loss $\Delta P0$ is normally smaller than the determination value $\Delta Pe$, it increases as the exhaust gas flowrate Qexh increases.

Next in a step S8, the controller 11 determines whether or not the differential pressure $\Delta P$ is greater than or equal to a limiting value comprising a fixed value added to the standard pressure loss $\Delta P0$. The fixed value is a positive value. This comparison allows a determination of whether or not the deposited amount of particulate matter on the particulate filter 4 has reached the limiting value for switching the calculation map for the maximum injection amount Qfmax. That is to say, when the determination result in the step S8 is negative, the deposited amount of particulate matter has not reached the limiting value. When the determination result in the step S8 is positive, the deposited amount of particulate matter has reached the limiting value or has exceeded the limiting value. The fixed value is set on the basis of experiment.

Figure 6:
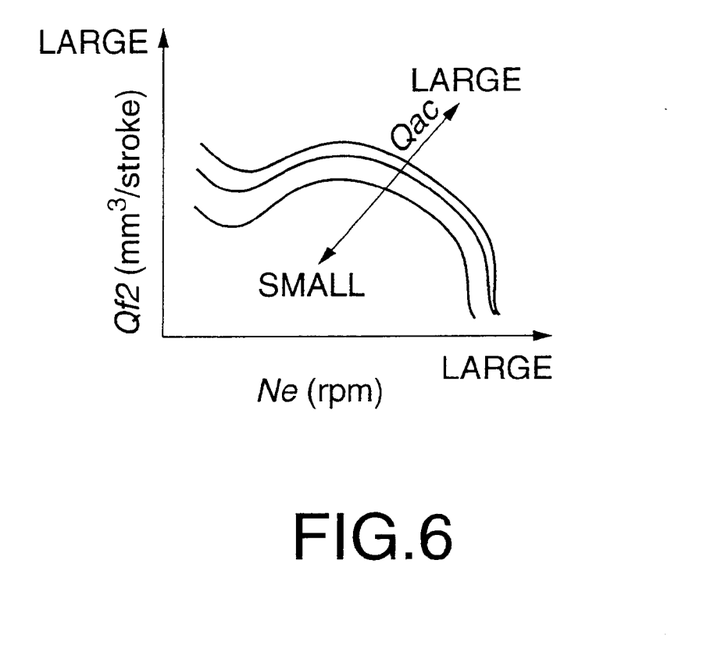
FIG. 6 is a diagram describing the characteristics of a map for a maximum fuel injection amount Qf2 which is stored in the controller.

When the determination result is negative, the controller 11 proceeds to a step S9 and calculates a map value Qf2 for the maximum injection amount based on the cylinder intake air amount Qac and the engine rotation speed Ne by looking up a map having the characteristics as shown in FIG. 6 which is pre-stored in its memory. Then in a step S10, after setting the maximum injection amount Qfmax to equal the map value Qf2, the routine is terminated. The map value Qf2 for the maximum injection amount is a value which limits the maximum fuel injection amount of the diesel engine 1 in order to prevent the production of large amounts of particulate matter when the deposited amount of particulate matter on the particulate filter 4 is low.

Figure 7:
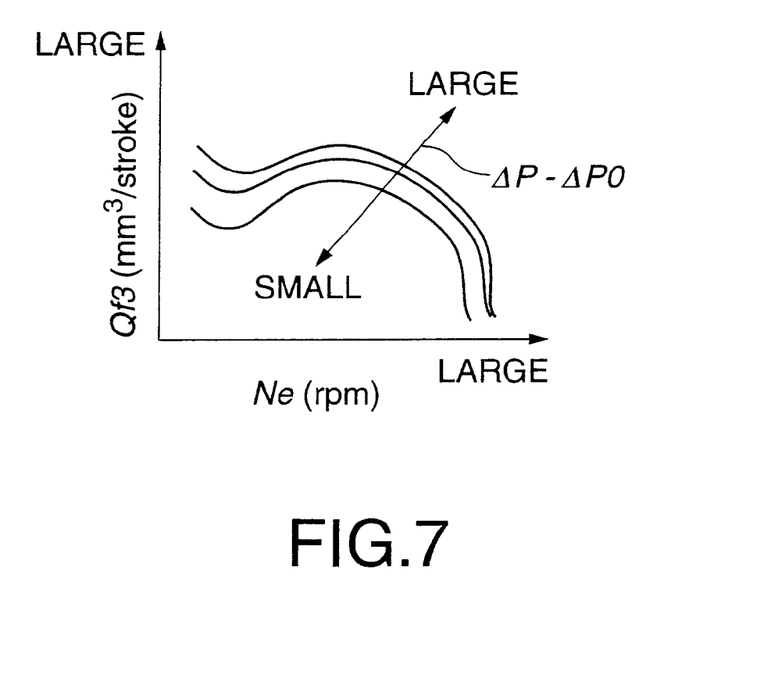
FIG. 7 is a diagram describing the characteristics of a map for a maximum fuel injection amount Qf3 which is stored in the controller.

When the determination result is positive, the controller 11 proceeds to a step S11 and calculates a map value Qf3 for the maximum injection amount based on the engine rotation speed Ne and the difference $\Delta P-\Delta P0$ of the pressure differential $\Delta P$ and the standard pressure loss $\Delta P0$ by looking up a map having the characteristics as shown in FIG. 7 which is stored in its memory. The map value Qf3 for the maximum injection amount is a fuel injection amount for the diesel engine 1 which is set in order to produce torque which is equal to the output torque of the diesel engine 1 produced under fully loaded conditions at a standard pressure loss $\Delta P0$ when the deposited amount of particulate matter is greater than or equal to the limiting value. When the engine rotation speed Ne is held constant, the output torque of the diesel engine 1 tends to decrease as the difference $\Delta P-\Delta P0$ increases. The map for Qf3 is adapted so that the map value Qf3 for the maximum injection amount increases the greater the difference $\Delta P-\Delta P0$ as shown in FIG. 7. The maps for Qf2 and Qf3 are set on the basis of experiment.

In FIG. 7, the map value Qf3 for the maximum injection amount is determined using the engine rotation speed Ne and the difference $\Delta P-\Delta P0$ as parameters. However since the correlation between the map value Qf3 and the engine rotation speed Ne is small, it is possible to calculate the map value Qf3 simply on the basis of the difference $\Delta P-\Delta P0$.

After executing the step S11, the controller 11 compares the inlet temperature T1 of the particulate filter 4 with a limiting exhaust gas temperature Ts in a step S12. Herein the limiting exhaust gas temperature Ts is set to 730° C. In the step S12, when the inlet temperature T1 does not exceed the limiting exhaust gas temperature Ts, the controller 11 sets the maximum fuel injection amount Qfmax to equal the map value Qf3 in a step S13 and the routine is terminated.

In the step S12, when the inlet temperature T1 exceeds the limiting exhaust gas temperature Ts, the controller 11, calculates a feedback amount Qfb in a step S14. When the inlet temperature T1 exceeds the limiting exhaust gas temperature Ts, the fuel injection amount is limited in order to reduce the inlet temperature T1 to less than the limiting exhaust gas temperature Ts. The feedback amount Qfb is provided for this purpose.

The feedback amount Qfb is calculated by Equation (4) below.

$$Qfb = Qfb_{n-1} + \Delta Q \qquad (4)$$

where, $Qfb_{n-1}$=the value for Qfb calculated on the immediately previous occasion when the routine was performed, and $\Delta Q$=fixed value.

The initial value of ?Q is zero. As shown in Equation (4), the feedback amount Qfb increases as the period for which the inlet temperature T1 exceeds the limiting exhaust gas temperature Ts increases.

In the subsequent step S15, the controller 11 sets a value in which the feedback amount Qfb is subtracted from the map value Qf3 as the maximum injection amount Qfmax and the routine is terminated.

If the regeneration flag does not have a value of zero in the step S3, that is to say, it has a value of unity, in a step S16, the controller 11 calculates the determination value as described above. Then in a step S17, it is determined whether or not the determination value $\Delta$Pe is greater than the pressure differential $\Delta$P upstream and downstream of the particulate filter 4.

When the regeneration flag has a value of unity, the regeneration process is performed on the particulate filter 4. When the determination value $\Delta$Pe is greater than the pressure differential $\Delta$P, it is determined that the regeneration process is complete. In this case, after the regeneration flag is reset to a value of zero in a step S18, the routine is terminated.

When the determination value $\Delta$Pe is not greater than the pressure differential $\Delta$P, the regeneration process is not complete. In this case, after maintaining the regeneration flag to a value of unity in the step S6 as described above, the routine is terminated.

Now referring to FIG. 8, the calculation routine for the target fuel injection amount of executed by the controller 11 will be described. This routine is performed repeatedly when a predetermined crank angle is detected by the crank angle sensor 13 during operation of the diesel engine 1, that is to say, when a Ref signal is input.

The controller 11 firstly in a step S21 reads the accelerator pedal depression amount CL, the engine rotation speed Ne and the maximum injection amount Qmax. The maximum injection amount Qmax is the most up-to-date value calculated in the routine shown in FIG. 4.

Figure 8:
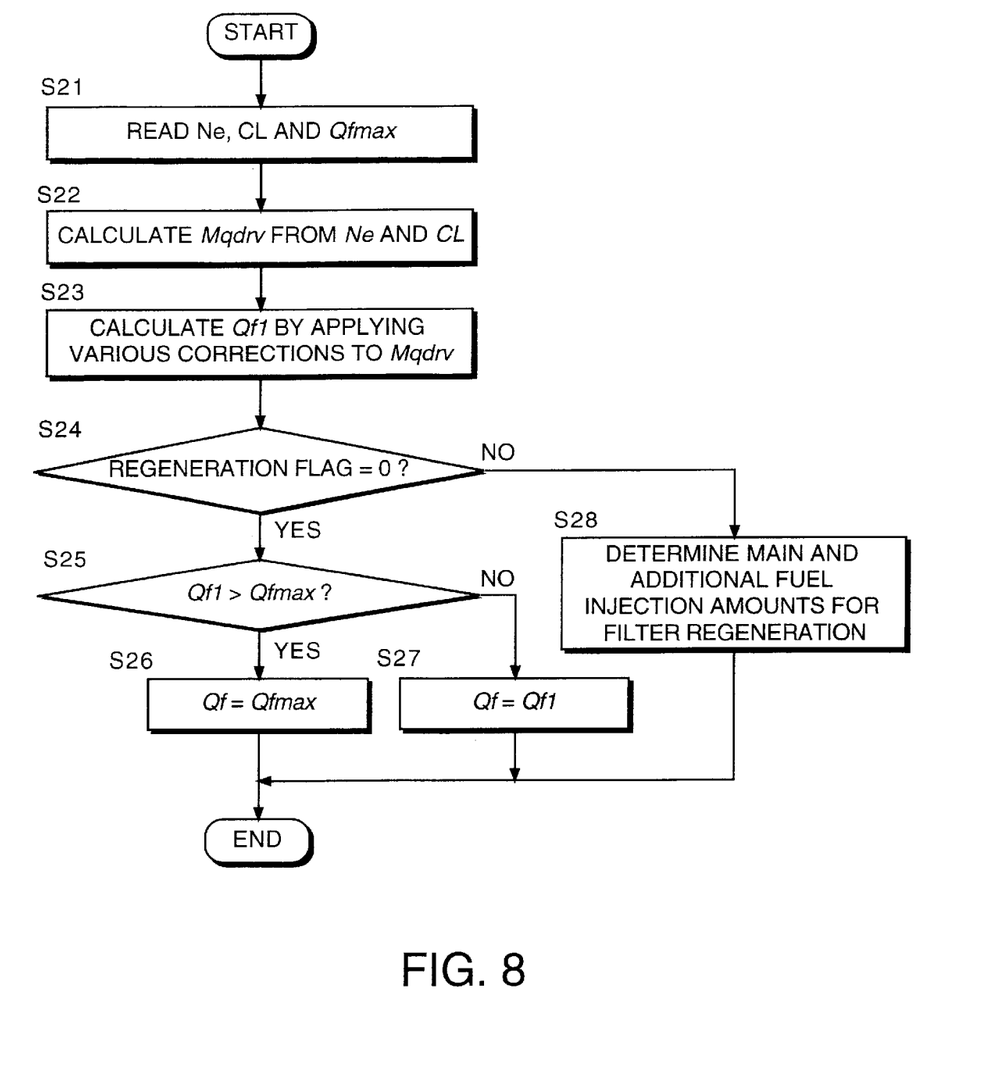
FIG. 8 is a flowchart describing a calculation routine for a target fuel injection amount Qf executed by the controller.
Figure 9:
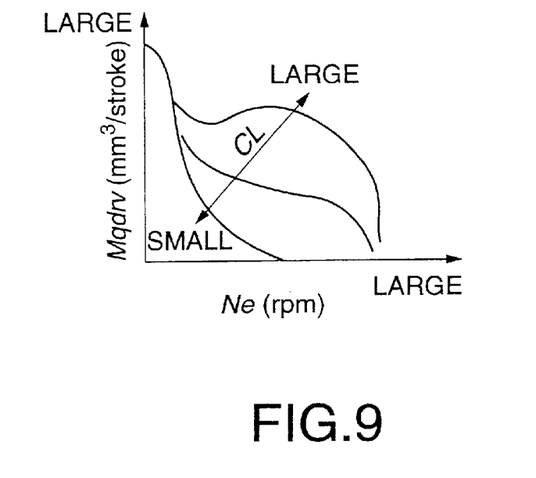
FIG. 9 is a diagram describing the characteristics of a map for a basic fuel injection amount Mqdrv which is stored in the controller.

Then in a step S22, the basic fuel injection amount Mqdrv is calculated using the engine rotation speed Ne and the accelerator pedal depression amount CL by referring to a map having the characteristics as shown in FIG. 9 which is pre-stored in the memory of the controller 11.

Then in a step S23, the fuel injection amount Qf1 is calculated by adding various types of corrections based on the engine cooling water temperature Tw to the basic fuel injection amount Mqdrv. The fuel injection amount Qf1 is a fuel injection amount which obtains an output torque corresponding to the depression of the accelerator pedal.

In a next step S24, the controller 11 determines if the regeneration flag is equal to unity. When the regeneration flag is not unity, i.e., when regeneration of the particulate filter 4 is not required, the controller compares, in a step S25, the fuel injection amount Qf1 with the maximum fuel injection amount Qfmax. When the fuel injection amount Qf1 exceeds the maximum fuel injection amount Qfmax, the controller 11 sets the target fuel injection amount Qf to be equal to the maximum fuel injection amount Qfmax in a step S26. When the fuel injection amount Qf1 does not exceed the maximum fuel injection amount Qfmax, the controller 11 sets the target fuel injection amount Qf to be equal to the fuel injection amount Qf1 in a step S27. After setting the target fuel injection amount Qf in the step S26 or Step S27 in this way, the controller 11 terminates the routine.

When the deposited amount of particulate matter on the particulate filter 4 is small, the problem arises that the amount of particulate matter increases when the fuel injection amount Qf1 is used without modification as the target fuel injection amount Of, if the diesel engine 1 is in or nearly in a fully loaded state. On the other hand, when a large amount of particulate matter has been deposited on the particulate filter 4, there tends to be insufficient engine output torque in or near to a fully loaded state.

According to this fuel injection control device, however, the maximum injection amount Qfmax used in the step S25 has been set to different values depending on the level of particulate matter deposited on the particulate filter 4, that is to say, in response to the determination in the step S8 in FIG. 4 as described above.

In other words, when the amount of particulate matter deposited on the particulate filter 4 is small, the pressure differential $\Delta$P increases in response to an increase in the deposited amount of particulate matter and the cylinder intake air amount Qac undergoes corresponding decreases. Thus the maximum injection amount Qmaxt=Qf2 obtained from the map in FIG. 6 decreases in response to increases in the level of particulate matter deposition.

The fuel injection amount Qf1 exceeds the maximum injection amount Qfmax in or near to a fully loaded state of the diesel engine 1. Thus output torque when the diesel engine 1 is in or nearly in a fully loaded state decreases as the amount of deposited particulate matter increases.

However according to this fuel injection control device, when the pressure differential $\Delta$P between upstream and downstream section expressing the amount of deposited particulate matter in the particulate filter 4 exceeds the limiting value in the step S8 in FIG. 4, the map for calculating the maximum injection amount Qfmax is switched from the map shown in FIG. 6 to the map shown in FIG. 7.

Figure 2A:
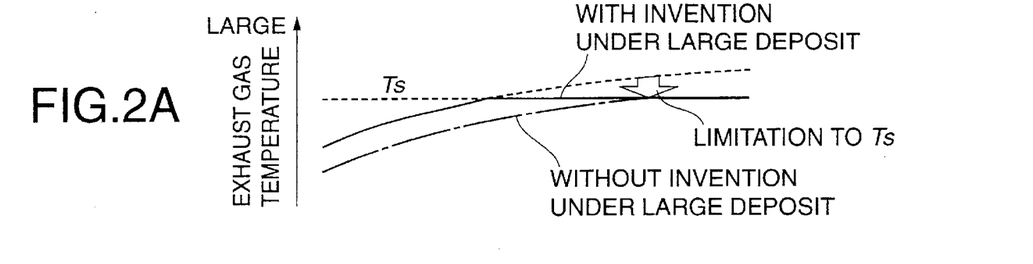
FIGS. 2A–2D are diagrams describing the operating characteristics of an engine in or near to a fully loaded state when applying fuel injection control according to this invention.
Figure 2B:
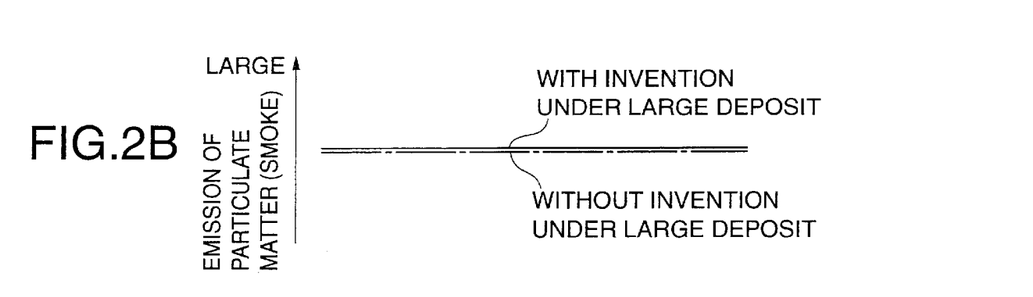
Figure 2C:
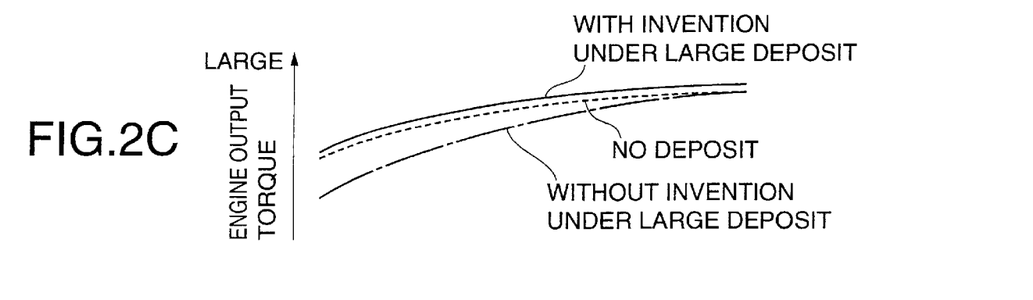
Figure 2D:
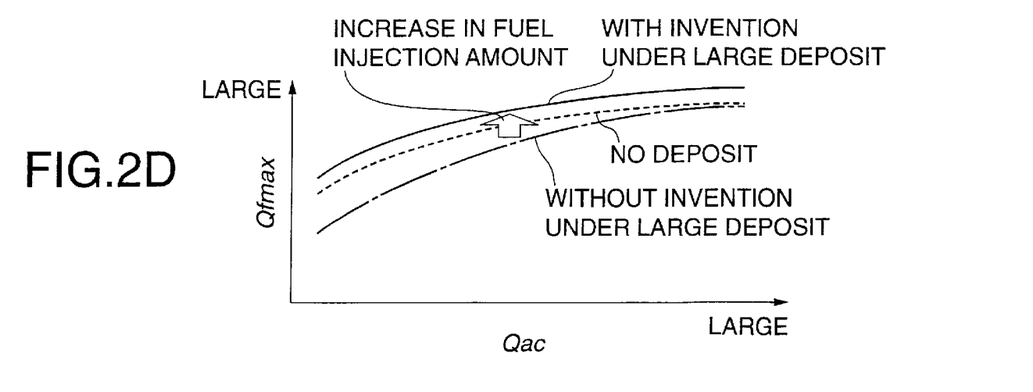

As a result, since the maximum injection amount Qfmax is increased as shown in FIG. 2D, it is possible to compensate for shortfalls in the output torque when the accelerator pedal is completely depressed during high levels of particulate matter deposition. Furthermore it is possible to obtain output torque which is equal to that obtained when the level of particulate matter deposition is low as shown in FIG. 2C.

Increases in the maximum injection amount Qfmax result in increases to the amount of particulate matter produced when the diesel engine 1 is in or nearly in a fully loaded state. However even when the production of particulate matter increases, such particulate matter is trapped by the particulate filter 4. Consequently even when the maximum injection amount Qfmax is increased, the amount of smoke discharged into the atmosphere does not change as shown in FIG. 2B.

When the fuel injection amount is increased in or near to a fully loaded state, the temperature of the exhaust gas increases. Since deposited particulate matter is combusted by such increases in the exhaust gas temperature, the deposited amount of particulate matter decreases. If the frequency of the regeneration process is reduced, fuel consumption is also reduced.

The process shown in the steps S12 to S15 of FIG. 4 is a process in order to avoid excessive increases in the exhaust gas temperature in the above situation. That is to say, when the inlet temperature T1 of the particulate filter 4 exceeds the limiting exhaust gas temperature Ts, the exhaust gas temperature is reduced by reducing the maximum injection amount Qfmax in order to avoid damaging the diesel engine 1. As a result, the exhaust gas temperature does not exceed the limiting exhaust gas temperature Ts as shown in FIG. 2A.

As described above, the controller 11 controls the injection timing as well as the fuel injection amount of the fuel injector 8. The target injection amount set by executing the above routine may be injected on a single occasion or may be injected on a plurality of occasions comprising main injection and auxiliary injection as a result of the controller 11 controlling the fuel injection timing of the fuel injector 8.

In the step S24 of FIG. 8, when the regeneration flag is unity, the controller 11 calculates the fuel injection amount for regeneration of the particulate filter 4. Herein, the controller sets the fuel injection amount of the main injection and that for the auxiliary injection. In order to regenerate the particulate filter 4, it is necessary to raise the exhaust gas temperature, and this is accomplished by, for example, increasing the fuel injection amount, retarding of the fuel injection timing, and execution of the auxiliary fuel injection subsequent to the main injection which is for the combustion. According to the routine of FIG. 8, providing that the auxiliary injection is performed after the main injection, the controller 11 sets the injection amount for both injections. After the processing of the step S28, the controller 11 terminates the routine.

Next a second embodiment of this invention will be described referring to FIGS. 10–12.

In the first embodiment, the level of the deposited amount of particulate matter in the particulate filter 4 was determined based on the difference $\Delta P - \Delta P0$ of the pressure differential upstream and downstream of the particulate filter 4 from the standard pressure loss $\Delta P0$. In this embodiment, the determination is performed based on a cylinder intake air amount differential Qd.

For this purpose, the fuel injection control device is further provided with a temperature sensor 21 and a pressure sensor 22 upstream of the airflow meter 15 in the air intake passage 2. The temperature sensor 21 detects atmospheric temperature Ta and the pressure sensor 22 detects atmospheric pressure Pa. Detected data from these sensors are input as signals into the controller 11.

Figure 10:
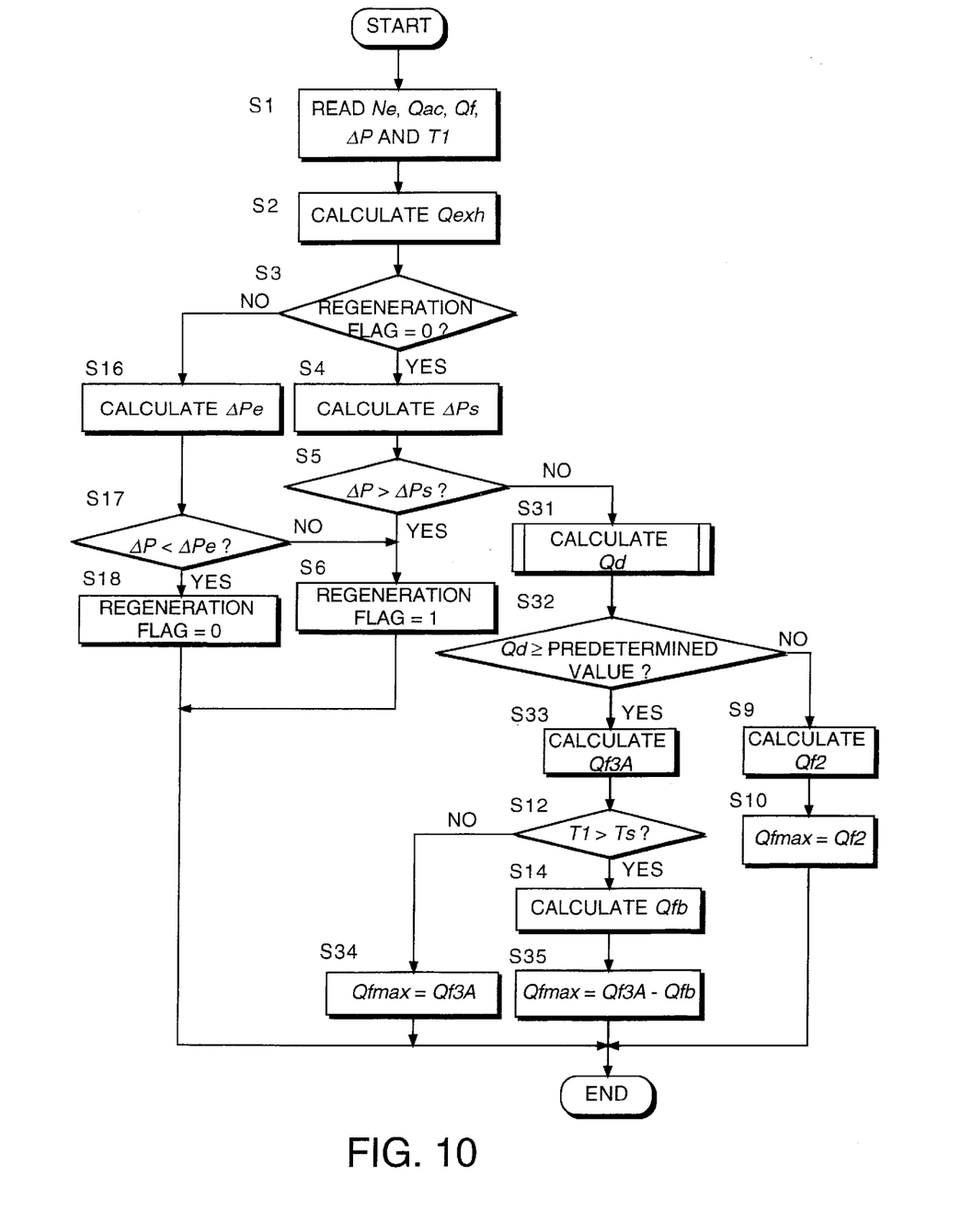
FIG. 10 is similar to FIG. 4, but showing a second embodiment of this invention.

The controller 11 executes a routine shown in FIG. 10 instead of the routine in FIG. 4 in order to set the regeneration flag and the maximum injection amount Qfmax.

The steps S1–S6, steps S9–S10 and steps S16–S18 of the routine in FIG. 10 are the same as those described in reference to FIG. 4. However the processing performed when the pressure differential $\Delta P$ is greater than the determination value $\Delta Ps$ in the step S5 differs from that of the routine shown in FIG. 4.

That is to say, in the step S5, when the pressure differential $\Delta P$ is greater than the determination value $\Delta Ps$, the controller 11 calculates the cylinder intake air amount differential Qd in a step S31. This calculation is performed by a subroutine shown in FIG. 11.

Figure 11:
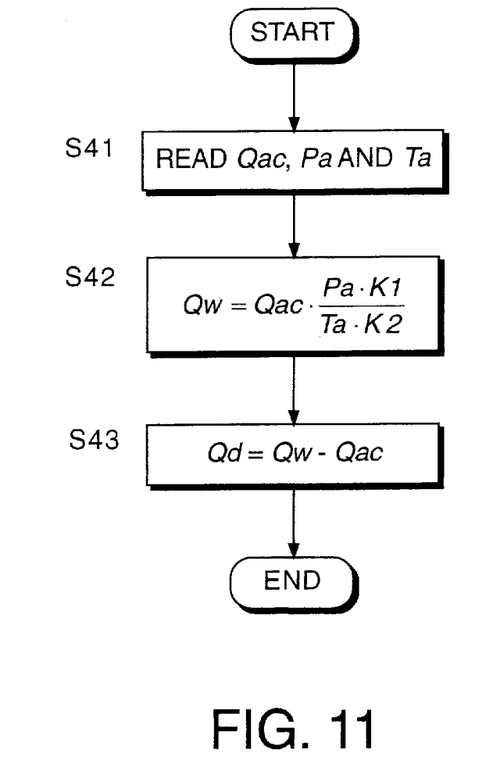
FIG. 11 is a flowchart showing a calculation routine for a cylinder intake air reduction amount Qd executed by a controller according to the second embodiment of this invention.

Referring to FIG. 11, firstly in a step S41, the controller 11 reads the cylinder intake air amount Qac, the atmospheric pressure Pa detected by the pressure sensor 21 and the atmospheric pressure Ta detected by the temperature sensor 22.

Then in a step S42, a standard cylinder intake air amount Qw is calculated using Equation (5) below.

$$Qw = Qac\ COEF \qquad (5)$$

where, $COEF = \dfrac{Pa \cdot K1}{Ta \cdot K2}$, and $K1, K2$ = constants.

The standard cylinder intake air amount Qw denotes the cylinder intake air amount when particulate matter has not been deposited on the particulate filter 4. The constants K1 and K2 are set so that when the atmospheric pressure is one atmosphere and atmospheric temperature is 20° C., the coefficient COEF takes a value of one, i.e., Qw becomes equal to Qac. At high altitudes at an atmospheric temperature of 20° C., the coefficient COEF takes a value smaller than one. At an atmospheric pressure of one atmosphere, the coefficient COEF takes a value smaller than one when the atmospheric temperature is greater than 20° C. and takes a value greater than one when the atmospheric temperature is smaller than 20° C. When the atmospheric temperature Ta and atmospheric pressure Pa are varied with respect to the same amount of particulate matter, the cylinder intake air amount also changes. It is for this reason that Qw is varied with respect to the atmospheric temperature Ta and atmospheric pressure Pa.

Then in a step S43, the controller 11 calculates the cylinder intake air amount differential Qd as the difference of the standard cylinder intake air amount Qw and the cylinder intake air amount Qac.

Figure 12:
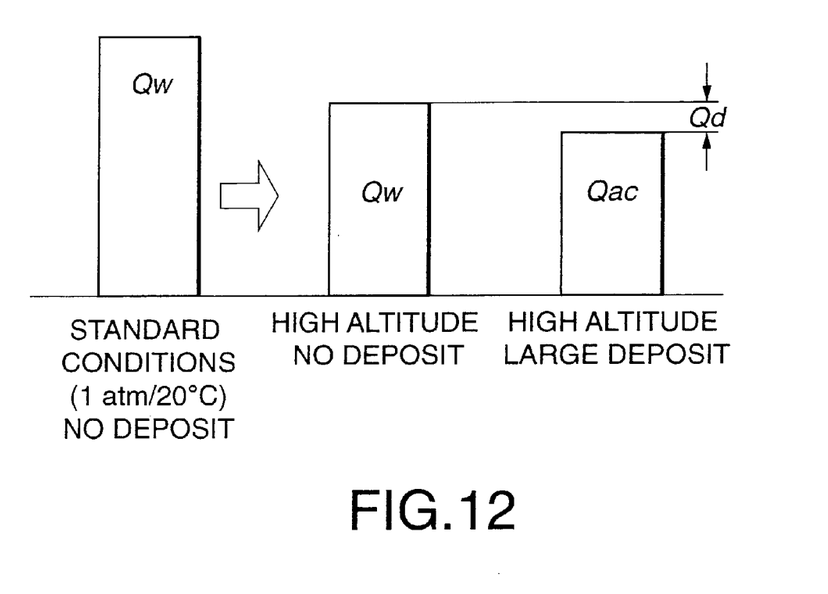
FIG. 12 is a diagram showing the effect of the deposition of particulate matter and atmospheric pressure on the intake air amount of the engine.

Referring to FIG. 12, with respect to the standard conditions wherein the atmospheric pressure is one atmosphere and the atmospheric temperature is 20° C., the standard cylinder intake air amount Qw is smaller at high altitudes even when no particulate matter deposition is present. In the same manner it even decreases at a corresponding temperature when no particulate matter deposition is present. Consequently when the vehicle is running at high altitudes at an atmospheric temperature of 20° C., the deposited amount of particulate matter on the particulate filter 4 is determined based on the difference Qd of the standard cylinder intake air amount Qw set for high altitude at an atmospheric temperature of 20° C., and the detected cylinder intake air amount Qac.

As a result, when no particulate matter is deposited on the particulate filter 4, the cylinder intake air amount differential Qd takes a value of zero irrespective of the atmospheric temperature and pressure. Furthermore the cylinder intake air amount differential Qd increases in response to increases in the deposited amount of particulate matter. After the process in the step S43, the controller 11 terminates the subroutine.

Referring again to FIG. 10, after calculating the cylinder intake air amount differential Qd in the step S11, the controller 11 compares it with a predetermined value in a next step S32. The predetermined value is a value to determine whether or not the deposited amount of particulate matter on the particulate filter 4 has reached a point for switching the calculation map for the maximum injection amount Qfmax. The predetermined value is set on the basis of experiment.

In the step S32, when the cylinder intake air amount differential Qd is less than the predetermined value, in the same manner as the steps S9 and S10 in the first embodiment, the maximum injection amount Qfmax is set to Qf2 and the routine is terminated.

When the cylinder intake air amount differential Qd is greater than or equal to the predetermined value in the step S32, the routine proceeds to a step S33. In the step S33, the controller 11 calculates a map value Qf3A for the maximum injection amount based on the cylinder intake air amount differential Qd and the engine rotation speed Ne by looking up a map having the characteristics shown in FIG. 13 which is pre-stored the memory of the controller 11.

Then in the step S12, the controller 11 compares the limiting exhaust gas temperature Ts with the inlet temperature T1 for the particulate filter 4 in the same manner as the first embodiment. If the inlet temperature T1 is not greater than the limiting exhaust gas temperature Ts, in a step S34, the controller 11 sets the maximum fuel injection amount Qfmax to equal the map value Qf3A and terminates the routine.

On the other hand, in the step S12, if the inlet temperature T1 of the particulate filter 4 is greater than the limiting exhaust gas temperature Ts, the controller 11 calculates a feedback amount Qfb in the step S14 in the same manner as the first embodiment and sets the maximum injection amount Qfmax by subtracting the feedback amount Qfb from the map value Qf3A in a step S35. After the process in the step S35, the controller 11 terminates the routine.

The method of determining the map value Qf3A is the same as the method of determining the map value Qf3 in the first embodiment. That is to say, under fully loaded conditions, the output torque of the diesel engine 1 when the amount of particulate matter deposition is greater than or equal to the limiting value is set to equal the output torque obtained when the amount of deposition is zero. When the engine rotation speed Ne is held constant, the output torque of the diesel engine 1 tends to decrease as the cylinder intake air amount differential Qd increases.

Figure 13:
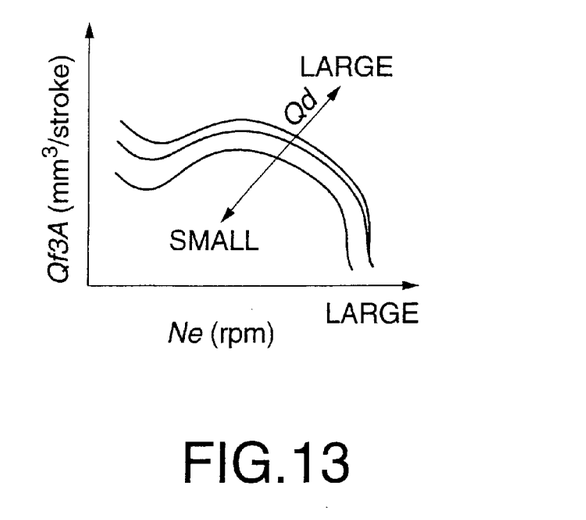
FIG. 13 is a diagram describing the characteristic of a map for a maximum injection amount Qf3A stored in the controller according to the second embodiment of this invention.

As shown in FIG. 13, the map value Qf3A for the maximum injection amount is set to increase as the cylinder intake air amount differential Qd increases. The map for Qf3A is set on the basis of experiment. In FIG. 13, although the map value Qf3A for the maximum injection amount is determined depending on the engine rotation speed Ne and the cylinder intake air amount differential Qd as parameters, since the correlation between the map value Qf3A and the engine rotation speed Ne is low, it is possible to determine the map value Qf3 simply on the basis of the cylinder intake air amount differential Qd.

The same effect as the first embodiment is obtained by this embodiment.

In this embodiment, the calculation of the target fuel injection amount Qf when the regeneration flag is zero and the fuel injection control for regeneration of the particulate filter 4 when the regeneration flag has a value of unity are performed using the same routine as the first embodiment.

The contents of Tokugan 2002-23805, with a filing date of Jan. 31, 2002 Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, this embodiment employs the cylinder intake air amount differential Qd which is related to the cylinder intake air amount Qac in order to determine the deposited amount of particulate matter. However instead of using the cylinder intake air amount Qac, it is possible to use the difference of the intake air flowrate detected by the airflow meter 15 and a standard air flowrate as a parameter.

The embodiments of this invention in which an exclusive property or privilege is claimed are defined as follows:

What is claimed is:

1. A fuel injection control device for a diesel engine, the diesel engine comprising an exhaust passage discharging exhaust gas produced by combustion of a mixture of fuel and air, and a particulate filter trapping particulate matter contained in the exhaust gas, the device comprising:

a fuel injector injecting fuel;

a sensor detecting a required output of the diesel engine;

a sensor detecting an intake air amount of the diesel engine;

a sensor detecting an operation condition of the engine; and a programmable controller controlling a fuel injection amount of the fuel injector to a target fuel injection amount, programmed to:

calculate a basic fuel injection amount based on the required output;

calculate a maximum fuel injection amount in response to the intake air amount;

determine based on the operating condition whether or not a deposited amount of the particulate matter on the particulate filter has exceeded a predetermined amount;

increase the maximum fuel injection amount when the deposited amount of the particulate matter has exceeded the predetermined amount; and set the smaller of the basic fuel injection amount and the maximum fuel injection amount as the target fuel injection amount.

2. The fuel injection control device as defined in claim 1, wherein the controller is further programmed to set an increment applied to the maximum fuel injection amount when the deposited amount of the particulate matter has exceeded the predetermined amount, to an amount which can compensate for a decrease in output torque of the diesel engine when the deposition amount of the particulate matter has increased.

3. The fuel injection control device as defined in claim 1, wherein the operating condition detecting sensor comprises a sensor detecting a pressure loss caused by the particulate filter, and the controller is further programmed to use the pressure loss in order to determine whether or not the deposited amount of the particulate matter has exceeded the predetermined amount.

4. The fuel injection control device as defined in claim 3, wherein the controller calculates a standard pressure loss corresponding to a state in which particulate matter is not deposited on the particulate filter, and determine whether or not the deposited amount of the particulate matter has exceeded the predetermined amount according to a difference of the pressure loss detected by the pressure loss sensor and the standard pressure loss.

5. The fuel injection control device as defined in claim 4, wherein the controller is further programmed to set the maximum fuel injection amount after increase to be larger as the difference of the pressure loss detected by the pressure loss sensor and the standard pressure loss increases.

6. The fuel injection control device as defined in claim 4, wherein the operation condition detecting sensor comprises a sensor detecting a rotation speed of the diesel engine, and the controller is further programmed to limit the maximum fuel injection amount after increase by referring to a pre-stored map specifying a limiting value according the rotation speed of the diesel engine and the difference of the pressure loss detected by the pressure loss sensor and the standard pressure loss as parameters.

7. The fuel injection control device as defined in claim 1, wherein the controller is further programmed to determine whether or not the deposited amount of the particulate matter has exceeded the predetermined amount according to decrease in the intake air amount.

8. The fuel injection control device as defined in claim 7, wherein the controller is further programmed to calculate a standard intake air amount corresponding to a state in which no particulate matter is deposited on the particulate filter and to determine whether or not the deposited amount of the particulate matter has exceeded the predetermined amount according to a difference of the intake air amount detected by the intake air amount detecting sensor and the standard intake air amount.

9. The fuel injection control device as defined in claim 8, wherein the operation condition detecting sensor comprises a sensor detecting an atmospheric pressure and a sensor detecting an atmospheric temperature, and the controller is further programmed to calculate the standard intake air amount based on the intake air amount detected by the intake air amount detecting sensor, the atmospheric pressure and the atmospheric temperature.

10. The fuel injection control device as defined in claim 8, wherein the controller is further programmed to increase the maximum fuel injection amount after increase as the difference of the intake air amount detected by the intake air amount detecting sensor and the standard intake air amount increases.

11. The fuel injection control device as defined in claim 8, wherein the operation condition detecting sensor comprises a sensor detecting a rotation speed of the diesel engine, and the controller is further programmed to limit the maximum fuel injection amount after increase by referring to a pre-stored map specifying a limiting value according to the rotation speed of the diesel engine, and the difference of the intake air amount detected by the intake air amount detecting sensor and the standard intake air amount as parameters.

12. The fuel injection control device as defined in claim 1, wherein the operation condition detecting sensor comprises a sensor detecting a temperature of the exhaust gas, and the controller is further programmed to limit the maximum fuel injection amount after increase so that the temperature of the exhaust gas does not exceed a predetermined temperature.

13. The fuel injection control device as defined in claim 12, wherein the controller is further programmed to reduce the maximum fuel injection amount after increase when the temperature of the exhaust gas has exceeded the predetermined temperature.

14. The fuel injection control device as defined in claim 1, wherein the controller is further programmed to control the fuel injector so that the target fuel injection amount is achieved by a single injection by the fuel indictor.

15. The fuel injection control device as defined in claim 1, wherein the controller is further programmed to control the fuel injector so that the target fuel injection amount is achieved by a plurality of injections by the fuel injector.

16. The fuel injection control device as defined in claim 1, wherein the operation condition detecting sensor comprises a sensor detecting a pressure loss caused by the particulate filter, and the controller is further programmed to determine whether or not regeneration of the particulate filter to remove particulate matter deposited on the particulate filter is required according to the pressure loss, and control the fuel injector to cause the exhaust gas temperature to increase, when the regeneration of the particulate filter is required.

17. The fuel injection control device as defined in claim 16, wherein the controller is further programmed to control the fuel injector to cause the exhaust gas temperature to increase by causing the fuel injector to inject the target fuel injection amount by a plurality of injections.

18. A fuel injection control device for a diesel engine, the diesel engine comprising an exhaust passage discharging exhaust gas produced by combustion of a mixture of fuel and air, and a particulate filter trapping particulate matter contained in the exhaust gas, the device comprising:

means for injecting fuel;

means for detecting a required output of the diesel engine;

means for detecting an intake air amount of the diesel engine;

means for detecting an operation condition of the engine;

means for controlling a fuel injection amount of the fuel injecting means to a target fuel injection amount;

means for calculating a basic fuel injection amount based on the required output;

means for calculating a maximum fuel injection amount in response to the intake air amount;

means for determining based on the operating condition whether or not a deposited amount of the particulate matter on the particulate filter has exceeded a predetermined amount;

means for increasing the maximum fuel injection amount when the deposited amount of the particulate matter has exceeded the predetermined amount; and means for setting the smaller of the basic fuel injection amount and the maximum fuel injection amount as the target fuel injection amount.

19. A fuel injection control method for a diesel engine, the diesel engine comprising an exhaust passage discharging exhaust gas produced by combustion of a mixture of fuel and air, a fuel injector injecting fuel and a particulate filter trapping particulate matter contained in the exhaust gas, the method comprising:

detecting a required output of the diesel engine;

detecting an intake air amount of the diesel engine;

detecting an operation condition of the engine;

controlling a fuel injection amount of the fuel injecting means to a target fuel injection amount;

calculating a basic fuel injection amount based on the required output;

calculating a maximum fuel injection amount in response to the intake air amount;

determining based on the operating condition whether or not a deposited amount of the particulate matter on the particulate filter has exceeded a predetermined amount;

increasing the maximum fuel injection amount when the deposited amount of the particulate matter has exceeded the predetermined amount; and setting the smaller of the basic fuel injection amount and the maximum fuel injection amount as the target fuel injection amount.

\* \* \* \* \*